(12) United States Patent
Sasaki et al.

(10) Patent No.: US 8,319,958 B2
(45) Date of Patent: Nov. 27, 2012

(54) PHASE MODULATOR, PHASE MODULATOR ASSEMBLY, AND PHOTOSENSOR

(75) Inventors: Kinichi Sasaki, Kunitachi (JP); Masao Takahashi, Fujisawa (JP); Masahiro Hamaguchi, Mie (JP); Takashi Miyabe, Kawasaki (JP); Tsuyoshi Kuwabara, Mie (JP); Tokihiro Umemura, Mie (JP)

(73) Assignees: Kabushiki Kaisha Toshiba, Tokyo (JP); Toshiba Industrial Products Manufacturing Corporation, Mie-ken (JP)

( * ) Notice: Subject to any disclaimer, the term of this patent is extended or adjusted under 35 U.S.C. 154(b) by 318 days.

(21) Appl. No.: 12/812,320

(22) PCT Filed: Jan. 9, 2009

(86) PCT No.: PCT/JP2009/050207
§ 371 (c)(1),
(2), (4) Date: Aug. 5, 2010

(87) PCT Pub. No.: WO2009/088072
PCT Pub. Date: Jul. 16, 2009

(65) Prior Publication Data
US 2010/0315621 A1 Dec. 16, 2010

(30) Foreign Application Priority Data
Jan. 10, 2008 (JP) .................. P2008-003540

(51) Int. Cl.
*G01N 21/00* (2006.01)

(52) U.S. Cl. ...................................... 356/73.1

(58) Field of Classification Search .................. None
See application file for complete search history.

(56) References Cited

U.S. PATENT DOCUMENTS

| 5,455,676 A | * | 10/1995 | Nishiura et al. | .............. 356/460 |
| 5,493,623 A | * | 2/1996 | Frische et al. | .................. 385/12 |
| 6,134,003 A | | 10/2000 | Tearney et al. | |

FOREIGN PATENT DOCUMENTS

| JP | 1-238297 | 9/1989 |
| JP | 2-21213 | 1/1990 |
| JP | 2-6425 | 2/1990 |
| JP | 2-163709 | 6/1990 |
| JP | 5-297292 | 11/1993 |
| JP | 6-167628 | 6/1994 |
| JP | 6-265361 | 9/1994 |
| JP | 3006205 | 11/1999 |

(Continued)

OTHER PUBLICATIONS

International Search Report from the Japanese Patent Office in International Application No. PCT/JP2009/050207 mailed Feb. 3, 2009.

(Continued)

*Primary Examiner* — Tu Nguyen
(74) *Attorney, Agent, or Firm* — Finnegan, Henderson, Farabow, Garrett & Dunner, L.L.P.

(57) ABSTRACT

The present invention provides a photosensor that uses a phase modulation technique for optical detection and conducts a highly accurate measurement. The photosensor uses a phase change difference of light propagated through a polarization preserving fiber with respect to tensile stress and employs proper polarization preserving fibers for a phase modulator 10, light-transmitting polarization preserving fiber 23, and coil-shaped polarization preserving fiber 30, to achieve a highly accurate measurement.

24 Claims, 12 Drawing Sheets

FOREIGN PATENT DOCUMENTS

| | | |
|---|---|---|
| JP | 2002-510795 | 4/2002 |
| JP | 2006-208080 | 8/2006 |
| JP | 2007-40884 | 2/2007 |

OTHER PUBLICATIONS

"Finite Cladding Effects in Highly Birefringement Fibre Taper-Polarisers", Electronic Letters, vol. 20, No. 10, pp. 398-399, (May 10, 1984).

Varnham, et al., "Coiled-birefringement-fiber polarizers", Optics Letters, vol. 9, pp. 306-308, (Jul. 1984).

Okamoto, "Single-polarization operation in highly birefringent optical fibers", Applied Optics, vol. 23, No. 15, pp. 2638-2642, (Aug. 1984).

Okamoto, et al., "High-Birefingence Polarizing Fiber with Flat Cladding", Journal of Lightwave Technology, vol. LT-3, No. 4, pp. 758-762, (Aug. 1985).

Messerly, et al., "A Broad-Band Single Polarization Optical Fiber", Journal of Lightwave Technology, vol. 9, No. 7, pp. 817-820, (Jul. 1991).

Muskhelishvili, "Some basic problems of the mathematical theory of elasticity," P. Noordhoff, Gronigen, Holland (1953), pp. 324-328.

Smith, "Single-Mode Fibre Pressure Sensitivity," Electronic Letters (Sep. 25, 1980), 16:773-774.

Office Action issued by the Canadian Patent Office on Sep. 18, 2012, for Canadian Patent Application No. 2,711,784.

\* cited by examiner

FIG. 5
| Name | Symbol | Value |
|---|---|---|
| Refractive index | $n$ | 1.45 |
| Photoelastic constant | $p_{11}$ | 0.121 |
| | $p_{12}$ | 0.270 |
| Poisson's ratio | $\nu$ | 0.17 |
| Young's modulus | $E$ | $730 \times 10^8 (N/m^2)$ |
| Clad diameter | $d$ | $125 \times 10^{-6} (m)$ |
FIG. 6
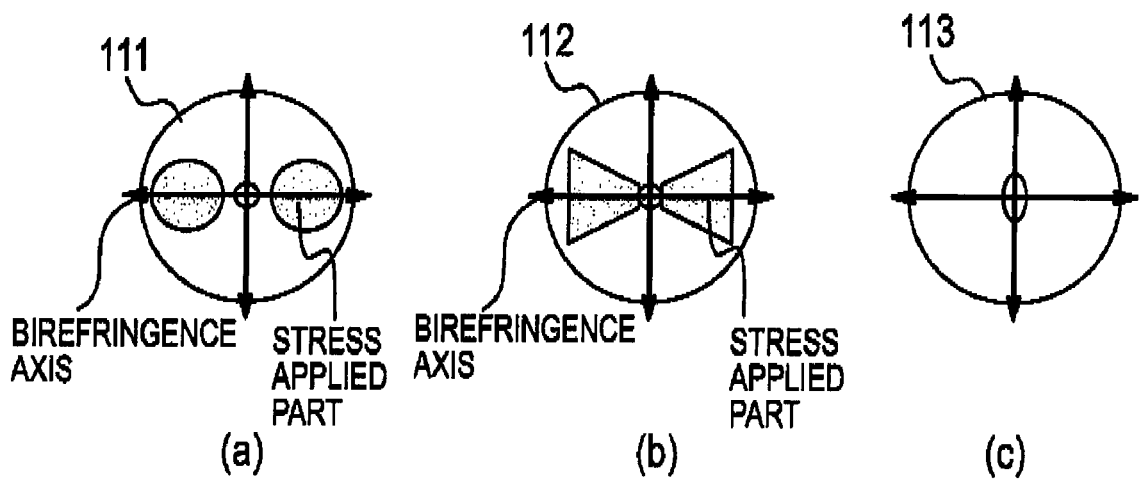
FIG. 7
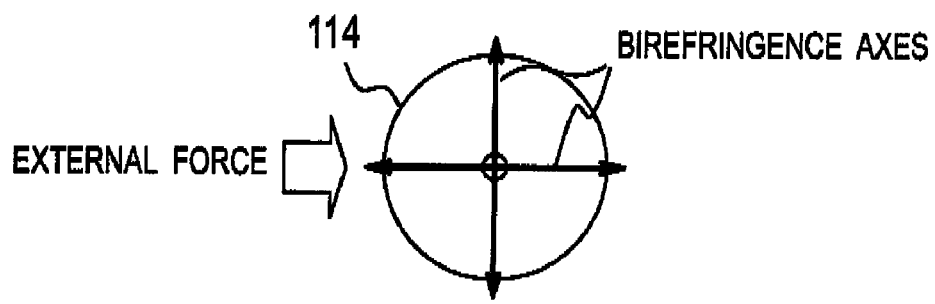

| | Fiber type | Specifications | Fiber expansion at phase change of $2\pi$ |
|---|---|---|---|
| Sample 1 | Panda-type fiber | $L_b$ < 2 mm, Clad dia.: 125 μm | 68.5 μm |
| Sample 2 | Panda-type fiber | $L_b$ = 1 to 2 mm, Clad dia.: 125 μm | 60.9 μm |
| Sample 3 | Panda-type fiber | $L_b$ = 1 to 2 mm, Clad dia.: 80 μm | 54.9 μm |
| Sample 4 | Bow-tie fiber | $L_b$ < 2 mm, Clad dia.: 125 μm | 1566.5 μm |
| Sample 5 | Bow-tie fiber | $L_b$ < 1.5 mm, Clad dia.: 80 μm | 1282.6 μm |
| Sample 6 | Elliptic core fiber | $L_b$ < 2 mm, Clad dia.: 80 μm | 1582.6 μm |

PHASE MODULATOR, PHASE MODULATOR ASSEMBLY, AND PHOTOSENSOR

TECHNICAL FIELD

The present invention relates to a phase modulator for applying mechanical stress to an optical fiber and thereby causing optical phase modulation, as wall as to a photosensor employing the phase modulator.

BACKGROUND TECHNOLOGY

There have been proposed various kinds of photosensors employing phase modulators that apply mechanical stress to optical fibers and thereby cause optical phase modulation. Among the known photosensors, there are, for example, the one mentioned in FIGS. 1(a) and 1(b) of Japanese Unexamined Patent Application Publication No. 2006-208080 "Optical fiber vibration sensor" (Patent Document 1), the one mentioned in FIG. 1 of Japanese Unexamined Patent Application Publication No. H06-265361 "Phase modulator and optical rotation detecting apparatus using the same" (Patent Document 2), the one mentioned in FIG. 2 of Published Japanese Translation of PCT Application No. 2002-510795 "Optical fiber acoustic sensor array based on Sagnac interferometer" (Patent Document 3), and the one mentioned in FIG. 1 of Japanese Unexamined Patent Application Publication No. 2007-40884 "Reflection optical fiber current sensor" (Patent Document 4). Phase modulators used with these photosensors include the one mentioned in FIG. 1 of Japanese Utility Model Publication No. H02-6425 "Optical-fiber-type phase modulator" (Patent Document 5) and the one mentioned in FIGS. 1 to 6 and 8 to 10 of Japanese Unexamined Patent Application Publication No. H05-297292 "Optical fiber phase modulator" (Patent Document 6).

The related arts, however, have technical problems mentioned next. A photosensor with the phase modulator mentioned in FIG. 1 of the Patent Document 5 winds a polarization preserving fiber around a piezoelectric element, to form the phase modulator. In the phase modulator of the photosensor, the piezoelectric element expands and contracts to expand and contract the polarization preserving fiber wound around the same in a longitudinal direction. At this time, a propagation constant difference between two light propagation axes of the polarization preserving fiber changes to cause phase modulation to light. If the polarization preserving fiber is randomly wound around the piezoelectric element, a difference in propagated light quantity between the two light propagation axes enlarges. Depending on a way of winding, it will be possible that the phase modulator propagates light through only one light propagation axis. This is because, like an optical fiber polarizer mentioned in FIG. 6 of Japanese Patent Publication No. 3006205 "Optical fiber polarizer" (Patent Document 7) and optical fiber polarizers mentioned in Non-Patent Documents 1 to 5, one of the light propagation axes of the polarization preserving fiber is aligned in a diametrical direction and is wound around a cylindrical winding frame, to form the fiber polarizer. As a result, light in one of the light propagation axes is extinguished. Accordingly, light that passes through the phase modulator formed by winding a polarization preserving fiber around a cylindrical or columnar piezoelectric element without controlling two light propagation axes of the fiber loses effective optical signal quantity components and causes intensity modulation in addition to the phase modulation, thereby deteriorating an original phase modulation function. This causes problems of deteriorating the productivity of phase modulators and lowering the measuring accuracy of the photosensor.

A photosensor with the phase modulator mentioned in FIGS. 1 to 6 and 8 to 10 of the Patent Document 6 is an advanced form of the photosensor mentioned in FIG. 1 of the Patent Document 5. This phase modulator externally applies mechanical stress to an optical fiber, thereby causing phase modulation. The photosensor, like the photosensor of the Patent Document 5, makes no consideration on controlling the two light propagation axes of a polarization preserving fiber. When propagating optical signal components through the two light propagation axes and applying a relative phase modulation to one of them, a loss occurs in a propagated light quantity depending on the directions of the light propagation axes of the polarization preserving fiber. In addition, a lateral pressure applied to the polarization preserving fiber causes a loss in a light quantity, to cause light intensity modulation. This results in deteriorating the measuring accuracy of the photosensor.

The photosensor includes, in addition to the above-mentioned phase modulator, many parts that are formed by winding polarization preserving fibers into coils. An example thereof is the optical fiber polarizer mentioned in FIG. 6 of the Patent Document 7. Other examples include a delay fiber coil in the reflection optical fiber current sensor mentioned in FIG. 1 of the Patent Document 4, a vibration sensor coil part 12 in the optical fiber vibration sensor mentioned in FIG. 1 of the Patent Document 1, and a sensing loop 6 in the phase modulator and optical rotation detecting apparatus using the same mentioned in FIG. 1 of the Patent Document 2. When receiving external vibration or thermal shock, the polarization preserving fiber coil causes resonant vibration and resonant contraction depending on the shape of the coil and the shape of a winding frame. A vibration source will be created when the above-mentioned expansion/contraction vibration of the phase modulator is propagated to a part that is not originally intended. If the resonant vibration or the resonant contraction occurs, the resonance phenomenon causes the polarization preserving fiber to expand and contract, to create a phase difference in the polarization preserving fiber due to the same principle as that of the phase modulator mentioned above. This is an error phase difference that is different from an originally intended controlled phase difference, and therefore, causes a problem of deteriorating the characteristics and measuring accuracy of the photosensor.

The photosensor with a phase modulator may be used with a signal processing unit that calculates a measuring physical quantity according to an optical signal. In this case, the signal processing unit and photosensor are optically connected to each other through a light-transmitting polarization preserving fiber that is in a non-coil shape and is used to transmit an optical signal. If the resonance phenomenon is externally applied to the light-transmitting fiber, an error phase difference occurs on the light propagated through the fiber, to cause the problem of deteriorating the characteristics and measuring accuracy of the photosensor. For example, in the case of a photosensor formed by inserting a light-transmitting polarization preserving fiber into an iron pipe serving as a protective pipe, slight vibration or sound applied to the iron pipe produces a sound or vibration standing wave inside the iron pipe, to cause the resonance phenomenon. The resonance phenomenon causes the polarization preserving fiber to expand and contract, thereby creating an error phase difference in the light propagated through the fiber and deteriorate the characteristics and measuring accuracy of the photosensor. In the case of the photosensor mentioned in FIG. 2 of the Patent Document 3, producing, by an influence of sound, a phase difference in a light-transmitting polarization preserving fiber other than a sensor coil is itself an error, and therefore, reducing the influence of sound on the light-transmitting polarization preserving fiber is a problem that must be solved.

Patent Document 1: Japanese Unexamined Patent Application Publication No. 2006-208080

Patent Document 2: Japanese Unexamined Patent Application Publication No. H06-265361

Patent Document 3: Published Japanese Translation of PCT Application No. 2002-510795

Patent Document 4: Japanese Unexamined Patent Application Publication No. 2007-40884

Patent Document 5: Japanese Utility Model Publication No. H02-6425

Patent Document 6: Japanese Unexamined Patent Application Publication No. H05-297292

Patent Document 7: Japanese Patent Publication No. 3006205

Non-Patent Document 1: F. Deformel, M. P. Varhham, and D. N. Payne: "Finite cladding effects in highly birefringent fibre taper-polarizers", Electron. Lett., 20, 10, p 398-p 399 (May 1984)

Non-Patent Document 2: M. P. Varnham, D. N. Payne, A. J. Barlow, and E. J. Tarbox: "Coiled-birefringent-fiber polarizers", Opt. Lett., 9, 7, p 306-p 308 (July 1984)

Non-Patent Document 3: K. Okamoto: "Single-polarization operation in highly birefringent optical fibers", Appl. Opt., 23, 15, p 2638-p 2642 (August 1984)

Non-Patent Document 4: K. Okamoto, T. Hosaka, and J. Noda: "High-birefringence polarizing fiber with flat cladding", IEEE J. Lightwave Technol., LT-3, 4, p 758-p 762 (August 1985)

Non-Patent Document 5: M. J. Messerly, J. R. Onstott, and R. C. Mikkelson: "A broad-band single polarization optical fiber", IEEE J. Lightwave Technol., 9, 7, p 817-p 820 (July 1991)

Non-Patent Document 6: Muskhelishvili, N. I., "Some basic problems of the mathematical theory of elasticity" (P. Noordhoff, Groningen, Holland, 1953), p 324-328

Non-Patent Document 7: Smith, A. M., Electronics Letters, vol. 16, No. 20, p 773-774, 1980

DISCLOSURE OF INVENTION

The present invention has been made in consideration of the above-mentioned technical problems of the related arts and an object thereof is to provide a photosensor employing a phase modulator having a good phase modulation characteristic, capable of resisting external vibration and thermal shock and achieving a highly accurate measurement.

An aspect of the present invention provides a phase modulator including a cylindrical or columnar actuator whose body has a characteristic of inducing mechanical vibration and a polarization preserving fiber having two light propagation axes that are orthogonal to each other, the fiber being wound around the actuator in such a manner to receive mechanical stress caused by the mechanical vibration in directions each of about 45 degrees with respect to the two light propagation axes.

Another aspect of the present invention provides a phase modulator including a cylindrical or columnar actuator whose body has a characteristic of inducing mechanical vibration and a polarization preserving fiber having two light propagation axes that are orthogonal to each other, the fiber being wound around the actuator in such a manner to receive mechanical stress isotropically with respect to the two light propagation axes.

Still another aspect of the present invention provides a phase modulator including a cylindrical or columnar actuator whose body has a characteristic of inducing mechanical vibration and a polarization preserving fiber having two light propagation axes that are orthogonal to each other, the fiber being wound around the actuator at a predetermined twist rate.

Still another aspect of the present invention provides a phase modulator assembly including a phase modulator and a vibration-proof material, the phase modulator including a cylindrical or columnar actuator whose body has a characteristic of inducing mechanical vibration and a polarization preserving fiber having two light propagation axes that are orthogonal to each other, the fiber being wound around the actuator in such a manner to receive mechanical stress caused by the mechanical vibration in directions each of about 45 degrees with respect to the two light propagation axes.

Another aspect of the present invention provides a photosensor including a photo-sensing unit to measure a measuring physical quantity, a signal processing unit to calculate a specified physical quantity according to a light signal from the photo-sensing unit, and an optical fiber to optically connect the photo-sensing unit and signal processing unit to each other, the optical fiber being a polarization preserving fiber having two light propagation axes each of which propagates light. The polarization preserving fiber is one that demonstrates a small change in a propagation constant difference between the two light propagation axes with respect to tensile stress.

Still another aspect of the present invention provides a photosensor including a photo-sensing unit to measure a measuring physical quantity, a signal processing unit to calculate a specified physical quantity according to a light signal from the photo-sensing unit, and an optical fiber to optically connect the photo-sensing unit and signal processing unit to each other. The photosensor includes, other than a phase modulator, a coil-shaped optical element formed of a polarization preserving fiber that demonstrates a small change in a propagation constant difference between two light propagation axes of the fiber with respect to tensile stress.

The present invention uses a phase change difference of light propagated through a polarization preserving fiber with respect to tensile stress and employs proper polarization preserving fibers for a phase modulator, light-transmitting polarization preserving fiber, and coil-shaped polarization preserving fiber optical element, to provide a photosensor capable of conducting a highly accurate measurement.

BRIEF DESCRIPTION OF DRAWINGS

FIG. 5 is Table 1.

FIG. 6 is sectional views of a panda-type fiber, a bow-tie-type fiber, and an elliptic core fiber serving as polarization preserving fibers.

FIG. 7 is an explanatory view of a behavior when stress is applied to a polarization preserving fiber.

BEST MODE OF IMPLEMENTING INVENTION

Embodiments of the present invention will be explained in detail with reference to the drawings.

(Principle of Operational of Phase Modulator)

First, the principle of operation of a phase modulator will be explained. A phase modulator 101 of FIG. 1 consists of a piezoelectric element, i.e., a PZT (piezo-tube) 101 and a polarization preserving fiber 102 wound around the PZT 101. The reason why the polarization preserving fiber 102 is used is to propagate light having no correlation through two optical axes of the polarization preserving fiber. The PZT 101 receives a voltage of a predetermined waveform, to expand and contract the polarization preserving fiber 102 wound around the PZT 101. At this time, the voltage waveform may be any one of a sinusoidal wave, sawtooth wave, triangular wave, and rectangular wave. The polarization preserving fiber 102 causes a phase change according to the expansion and contraction of the PZT 101.

Figure 2:
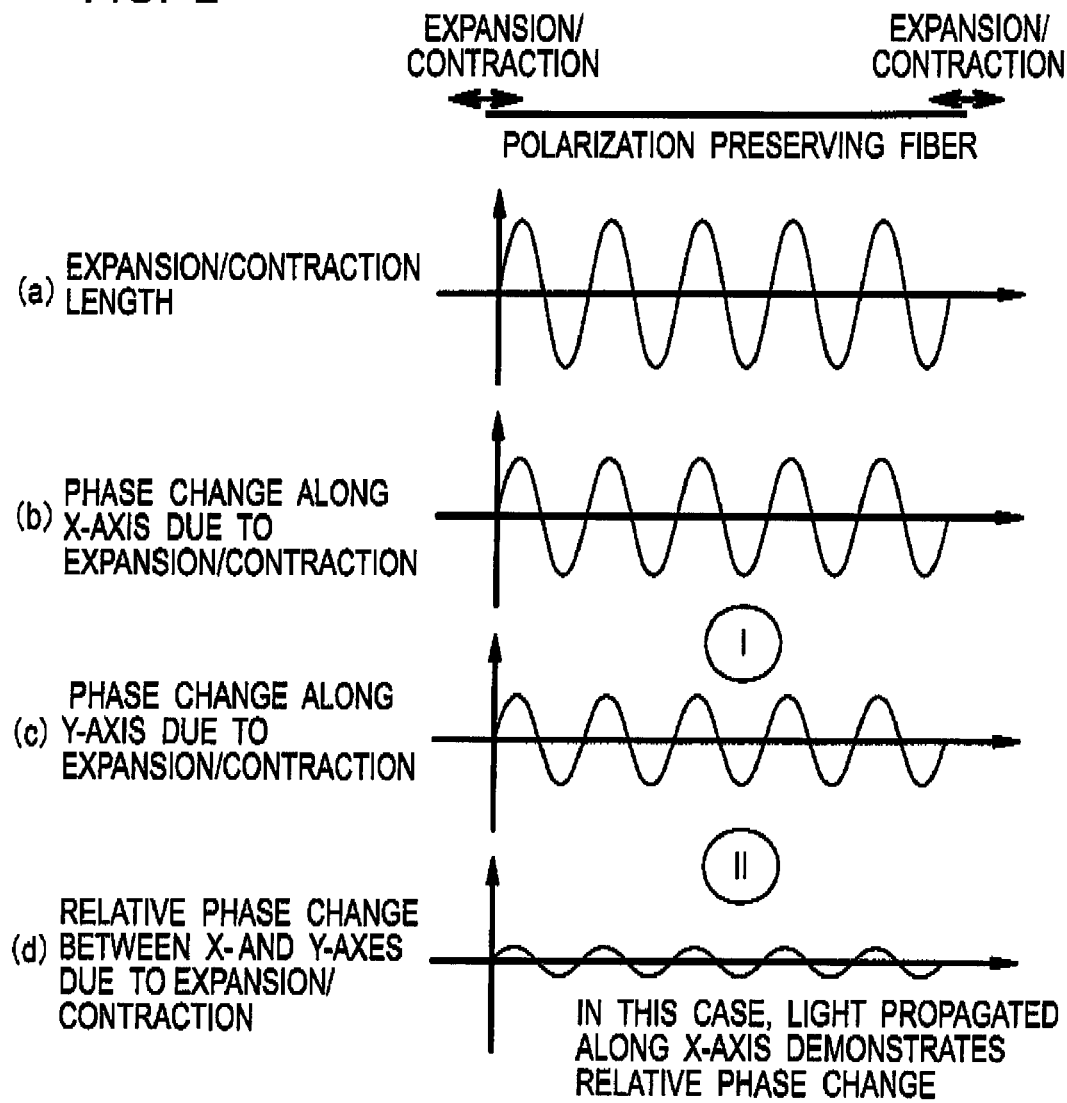
FIG. 2 illustrates graphs explaining phase changes of propagated light caused by the expansion and contraction of a general polarization preserving fiber.

FIG. 2 is an imaginary view of the case that applies a sinusoidal wave as the predetermined voltage waveform to the PZT 101, to apply sinusoidal-wave phase modulation to light propagated through the polarization preserving fiber 102. FIG. 2(a) illustrates expansion/contraction changes in the length of the polarization preserving fiber 102, FIG. 2(b) a phase change along an x-axis due to the expansion/contraction, FIG. 2(c) a phase change along a y-axis due to the expansion/contraction, and FIG. 2(d) a relative phase change between the x- and y-axes due to the expansion/contraction. Phase changes occurring along the two optical axes (x-axis and y-axis) of the polarization preserving fiber 102 are generally not equal to each other. Accordingly, light propagated through one of the optical axes receives a relative phase change (in FIG. 2, the light propagated through the x-axis receives the relative phase change). This results in providing only light propagated through one of the optical axes with an effective phase modulation. Here, an important point is whether or not the expansion/contraction of the polarization preserving fiber 102 can apply a sufficient phase change to light.

Light propagated through the polarization preserving fiber 102 receives a phase change physically because birefringence changes due to the expansion/contraction of the optical fiber. Due to the expansion/contraction of the optical fiber, the optical fiber receives stress to change the sectional shape thereof. At this time, the birefringence change $\Delta\beta$ due to the expansion/contraction of the optical fiber is expressed as follows:

$$\Delta\beta = \Delta\beta_S + \Delta\beta_G \qquad \text{[Mathematical 1]}$$

Here, $\Delta\beta S$ is a birefringence change due to expansion/contraction stress and $\Delta\beta G$ is a birefringence change due to a sectional shape change.

The birefringence change $\Delta\beta S$ due to expansion/contraction stress is resolvable into a birefringence change $\Delta\beta Sz$ due to tensile stress (longitudinal load stress) in a light propagation direction caused by diametrical expansion/contraction of the PZT 101 and a birefringence change $\Delta\beta Sr$ due to lateral load stress in a fiber diametrical direction caused by the diametrical expansion/contraction of the PZT 101.

$$\Delta\beta_S = \Delta\beta_{S,z} + \Delta\beta_{S,r} \qquad \text{[Mathematical 2]}$$

An assumption is made that the sectional shape changes according to the expansion and contraction of the fiber. Then, the birefringence change $\Delta\beta_G$ according to the sectional shape change becomes $\Delta\beta G \approx 0$, and therefore, is negligible. It is necessary, therefore, to evaluate which of $\Delta\beta Sz$ and $\Delta\beta Sr$ more conspicuously appears. In the following, a phase change is theoretically evaluated for each of the cases of applying lateral load and longitudinal load to the optical fiber.

(1) The Case of Applying Lateral Load to Optical Fiber

Figure 3:
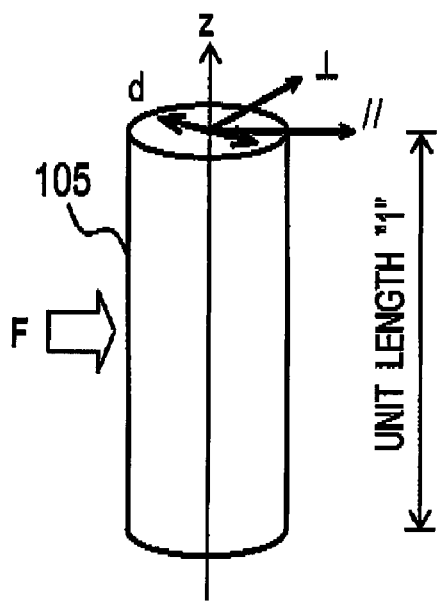
FIG. 3 is an explanatory view of stress when a lateral load is applied to an optical fiber.

Acting stress on a column center axis (z-axis) when a lateral load vector F is externally applied to a column has mathematically been analyzed by Muskhelishvili of the Non-Patent Document 6. Namely, as illustrated in FIG. 3, a column

105 has a diameter d and receives an external force F. On the center axis of the column, compression stress works in the direction of the external force F as follows:

$$\sigma_{F//} = \frac{6F}{\pi d} \quad \text{[Mathematical 3]}$$

In a direction orthogonal to the external force F, the following tensile stress works:

$$\sigma_{F\perp} = \frac{2F}{\pi d} \quad \text{[Mathematical 4]}$$

These pieces of acting stress concentrate around the z-axis. As mentioned in the Non-Patent Document 7, the stress acts in a minute area of a core part of an optical fiber that may be considered as the column 105. It is understood that the sum total of the acting stress uniformly works in principle.

Accordingly, the stress acting around the z-axis (core area) in the direction (direction //) of the external force F is expressed as follows:

$$\sigma_{//} = -(\sigma_{F//} + \sigma_{F\perp}) = -\frac{8F}{\pi d} \quad \text{[Mathematical 5]}$$

Here, the minus sign means that the compression stress acts on the z-axis in the direction of the external force F due to the external force F.

Consequently, the acting stress in the directions of t-axis and z-axis is expressed as follows:

$$\sigma_\perp = -\nu \sigma_{//} = \frac{8F}{\pi d} \quad \text{[Mathematical 6]}$$

$$\sigma_z = \sigma_\perp = \frac{8F}{\pi d}$$

Here, $\nu$ is a Poisson ratio of the column 105, i.e., optical fiber.

With a Young's modulus of the optical fiber being E, strain in each direction is expressed as follows:

$$\varepsilon_{//} = \frac{\sigma_{//}}{E} = -\frac{8F}{\pi E d} \quad \text{[Mathematical 7]}$$

$$\varepsilon_\perp = \frac{\sigma_\perp}{E} = \frac{8\nu F}{\pi E d} = \varepsilon_z$$

Next, a photoelasticity theory is used to calculate a refractive index change $\Delta n$ in each of the parallel direction (direction //) and orthogonal direction (direction $\perp$) is calculated as follows:

Direction //        [Mathematical 8]

$$\Delta n_{//} = -\frac{n^3}{2} \sum_{i=1}^{3} p_{1i} \varepsilon_i$$

$$= -\frac{n^3}{2}(p_{11}\varepsilon_1 + p_{12}\varepsilon_{12} + p_{13}\varepsilon_3)$$

$$= -\frac{n^3}{2}(p_{11}\varepsilon_{//} + p_{12}\varepsilon_\perp + p_{12}\varepsilon_z)$$

$$= -\frac{n^3}{2}(-p_{11} + 2\nu p_{12})\frac{8F}{\pi E d}$$

Here, n is a refractive index of the fiber core under no load and pli is a photoelasticity constant of the optical fiber. On an assumption that the optical fiber is an isotropic medium, it is set as p13=p12. In addition, the following is set:

$$\varepsilon_1 = \varepsilon_{//}, \quad \varepsilon_2 = \varepsilon_\perp, \quad \varepsilon_3 = \varepsilon_z \quad \text{[Mathematical 9]}$$

Direction $\perp$        [Mathematical 10]

$$\Delta n_\perp = -\frac{n^3}{2} \sum_{i=1}^{3} p_{1i} \varepsilon_i$$

$$= -\frac{n^3}{2}(p_{11}\varepsilon_1 + p_{12}\varepsilon_{12} + p_{13}\varepsilon_3)$$

$$= -\frac{n^3}{2}(p_{11}\varepsilon_\perp + p_{12}\varepsilon_{//} + p_{12}\varepsilon_z)$$

$$= -\frac{n^3}{2}(-\nu p_{11} - p_{12} + \nu p_{12})\frac{8F}{\pi E d}$$

Here, the following is set:

$$\epsilon_1 = \epsilon_\perp, \epsilon_2 = \epsilon_{//}, \epsilon_3 = \epsilon_z \quad \text{[Mathematical 11]}$$

Unlike the direction //, the direction $\perp$ replaces $\epsilon 1$ and $\epsilon 2$ with each other because an acting stress direction with respect to the photoelasticity constant differs by 90 degrees between the directions // and $\perp$.

From the above, the refractive index change $\Delta n$ of the optical fiber core caused by the lateral load vector F is expressed as follows:

$$\Delta n = \Delta n_{//} - \Delta n_\perp \quad \text{[Mathematical 12]}$$

$$= \frac{4n^3}{\pi}(p_{11} - p_{12})(1+\nu)\frac{F}{Ed}$$

Next, a phase change ratio $\Delta\phi$ due to the refractive index change $\Delta n$ of the optical fiber core caused by the lateral load F is calculated. Here, the phase difference $\phi$ is defined as follows:

$$\varphi = \frac{2\pi n L}{\lambda} \quad \text{[Mathematical 13]}$$

Here, L is the length of the optical fiber and $\lambda$ is a light wavelength.

The phase change ratio $\Delta\phi/\phi$ is developed as follows:

$$\frac{\Delta\varphi}{\varphi} = \frac{1}{\varphi}\frac{\Delta\varphi}{\Delta L}\Delta L + \frac{1}{\varphi}\frac{\Delta\varphi}{\Delta n}\Delta n \quad [\text{Mathematical 14}]$$

$$= \frac{1}{L}\Delta L + \frac{1}{n}\Delta n$$

Here, $\Delta L/L$ is a length change ratio of the optical fiber and is equal to strain in the z-direction.

$$\frac{\Delta L}{L} = \varepsilon_z = \varepsilon_\perp = \frac{8\nu F}{\pi E d} \quad [\text{Mathematical 15}]$$

Accordingly, the following is established:

$$\frac{\Delta\varphi}{\varphi} = \frac{8\nu F}{\pi E d} + \frac{4n^2}{\pi}(p_{11}-p_{12})(1+\nu)\frac{F}{Ed} \quad [\text{Mathematical 16}]$$

$$= (2\nu + n^2(p_{11}-p_{12})(1+\nu))\frac{4F}{\pi Ed}$$

$$= S_1$$

(2) The Case of Applying Longitudinal Load to Optical Fiber

Figure 4:
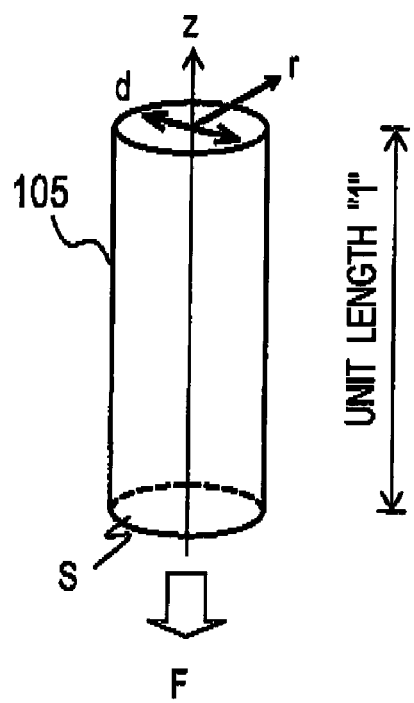
FIG. 4 is an explanatory view of stress when a longitudinal load is applied to an optical fiber.

Next, as illustrated in FIG. 4, a consideration is made on the case of applying force on the optical fiber in a light propagation direction (longitudinal load). Stress in the z-axis and r-axis directions is expressed as follows:

$$\sigma_z = \frac{F}{S} = \frac{F}{\pi\left(\frac{d}{2}\right)^2} = \frac{4F}{\pi d^2} \quad [\text{Mathematical 17}]$$

$$\sigma_r = -\nu\sigma_z = -\nu\frac{4F}{\pi d^2}$$

Accordingly, strains in the z-axis and r-axis directions are as follows:

$$\varepsilon_z = \frac{\sigma_z}{E} = \frac{4F}{\pi E d^2} = \frac{\Delta L}{L} = \varepsilon \quad [\text{Mathematical 18}]$$

$$\varepsilon_r = -\nu\varepsilon_z = -\nu\frac{4F}{\pi E d^2} = -\nu\varepsilon$$

Here, E is a Young's modulus of the optical fiber.
Based on the photoelasticity theory, a refractive index change $\Delta n$ is calculated as follows:

$$\Delta n = -\frac{n^3}{2}\sum_{i=1}^{3}p_{1i}\varepsilon_i \quad [\text{Mathematical 19}]$$

$$= -\frac{n^3}{2}(p_{11}\varepsilon_1 + p_{12}\varepsilon_{12} + p_{13}\varepsilon_3)$$

$$= -\frac{n^3}{2}(p_{11}\varepsilon_r + p_{12}\varepsilon_r + p_{12}\varepsilon_z)$$

$$= -\frac{n^3}{2}(-\nu p_{11}\varepsilon - \nu p_{12}\varepsilon + p_{12}\varepsilon)$$

$$= -\frac{n^3}{2}((p_{11}+p_{12})\nu - p_{12})\varepsilon$$

On an assumption that the optical fiber is an isotropic medium, it is set as p13=p12. In addition, the following is set:

$$\epsilon_1 = \epsilon_2 = \epsilon_r, \epsilon_3 = \epsilon_z \quad [\text{Mathematical 20}]$$

From the above-mentioned result, a phase change ratio $\Delta\phi/\phi$ due to the refractive index change $\Delta n$ of the optical fiber core caused by the longitudinal load F is calculated as follows:

$$\frac{\Delta\varphi}{\varphi} = \frac{\Delta L}{L} + \frac{\Delta n}{n} \quad [\text{Mathematical 21}]$$

$$= \varepsilon_z + \frac{n^2}{2}((p_{11}+p_{12})\nu - p_{12})\varepsilon$$

$$= \left(1 + \frac{n^2}{2}((p_{11}+p_{12})\nu - p_{12})\right)\varepsilon$$

$$= \left(1 + \frac{n^2}{2}((p_{11}+p_{12})\nu - p_{12})\right)\frac{4F}{\pi E d^2}$$

$$= S_2$$

(3) Evaluation of Phase Change Caused by Load Applied to Optical Fiber

According to the phase change ratios S1 and S2 of the optical fiber with respect to the lateral load and longitudinal load, it is evaluated which of them gives a larger influence. The evaluation is made on an assumption that the optical fiber is a general single-mode quartz fiber. Physical properties of the single-mode quartz fiber are listed in Table 1 of FIG. 5.

The phase change ratio S1 with respect to the lateral load is evaluated as follows:

$$S_1 = (2\nu + n^2(p_{11}-p_{12})(1+\nu))\frac{4F}{\pi E d} \quad [\text{Mathematical 22}]$$

$$= (2\times 0.17 + 1.45^2 \times (0.121 -$$

$$0.270)(1+0.17))\frac{4F}{\pi\times 730\times 10^8 \times 125\times 10^{-6}}$$

$$= -3.7\times 10^{-9}\cdot F$$

Here, F is in a unit of N (Newton).
Next, the phase change ratio 52 with respect to the longitudinal load is evaluated as follows:

$$S_2 = \left(1 + \frac{n^2}{2}((p_{11}-p_{12})\nu - p_{12})\right)\frac{4F}{\pi E d^2} \quad [\text{Mathematical 23}]$$

$$= \left(1 + \frac{1.45^2}{2}((0.121+0.270)\times 0.17 -$$

$$0.270)\right)\frac{4F}{\pi\times 730\times 10^8 \times (125\times 10^{-6})^2}$$

$$= 8.8\times 10^{-4}\cdot F$$

Here, F is in a unit of N (Newton).
Accordingly, S2>>S1. Namely, the phase change with respect to the longitudinal load is dominant and the phase change with respect to the lateral load is ignorable.

The above is a consideration relating to the general single-mode quartz fiber. Since the PZT 101 is wound with the polarization preserving fiber 102, influences of the lateral load and longitudinal load on the polarization preserving fiber 102 must be evaluated. The polarization preserving fiber 102 induces birefringence when external stress is applied to the fiber core thereof. It may also induce birefringence due to the shape of the fiber core. When linearly polarized light is propagated in the direction of the birefringence, the fiber can propagate the linearly polarized light without breaking the polarized state (refer to FIG. 6). This is considered as a state in which a certain lateral load is always applied to the optical fiber (refer to FIG. 7). FIG. 6(a) is a panda-type fiber 111 and FIG. 6(b) is a bow-tie-type fiber 112. These fibers involve birefringence created by application of stress. FIG. 6(c) is an elliptic core fiber 113 that involves birefringence created by core shape. FIG. 7 illustrates birefringence axes induced by lateral load applied to a single-mode fiber 114.

Even if a further lateral load change vector AF is externally applied to the polarization preserving fiber 102, a phase change caused by AF is sufficiently smaller than that caused by longitudinal load. It is concluded, therefore, that longitudinal load is a main factor of phase change of the polarization preserving fiber 102.

(4) Influence of Longitudinal Load on Polarization Preserving Fiber (Difference in Phase Change Depending on Fiber Kind)

Figure 1:
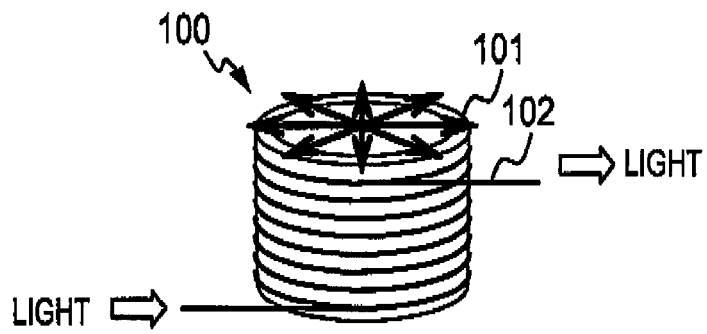
FIG. 1 is an operational explanatory view of a general phase modulator.

In FIG. 1, the phase modulator 100 formed by winding the polarization preserving fiber 102 around the PZT 101 causes a phase change due to an expansion/contraction (longitudinal load) of the polarization preserving fiber 102 caused by a diametrical expansion/contraction of the PZT 101. At this time, a phase change occurs on each of the two optical axes of the polarization preserving fiber 102 and a relative difference of the phase changes of the two axes becomes an effective phase change component. It is important, therefore, to find which type of polarization preserving fibers causes what amount of phase change with respect to longitudinal load. For this, longitudinal load is applied to the three kinds of polarization preserving fibers, i.e., the panda-type fiber 111 illustrated in FIG. 6(a), the bow-tie fiber 112 illustrated in FIG. 6(b), and the elliptic core fiber 113 illustrated in FIG. 6(c), to evaluate phase changes.

An electric field component E of light propagated through two optical axes of a polarization preserving fiber is expressed as follows on an assumption that the propagated light has the same electric field strength of E0 for the sake of simplicity:

$$E_x = E_0 \exp i(\omega t - \beta_x \cdot z)$$

$$E_y = E_0 \exp i(\omega t - \beta_y \cdot z) \quad \text{[Mathematical 24]}$$

Here, ω is an angular frequency of light and βx and βy are light propagation constants of the optical axes of the polarization preserving fiber 102.

For the sake of simplicity, phases are shifted as follows:

$$E_x = E_0 \exp i(\omega t - (\beta_x - \beta_y) \cdot z) = E_0 \exp i(\omega t - \delta\beta \cdot z)$$

$$E_y = E_0 \exp i\omega t \quad \text{[Mathematical 25]}$$

Here, $\delta\beta = \beta_x - \beta_y$ is a propagation constant difference between the optical axes of the polarization preserving fiber 102.

Figure 8:
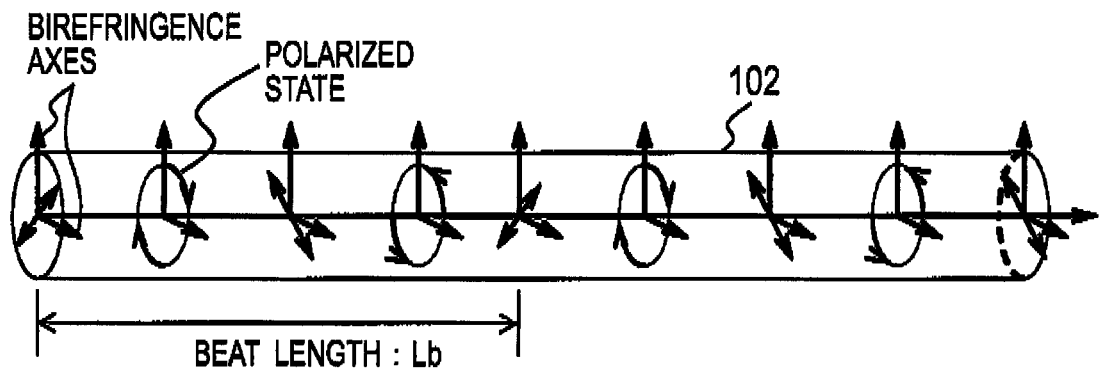
FIG. 8 is an explanatory view of propagated and polarized states when linearly polarized light is made incident to a polarization preserving fiber at an angle of 45 degrees with respect to an optical axis.
Figure 9:
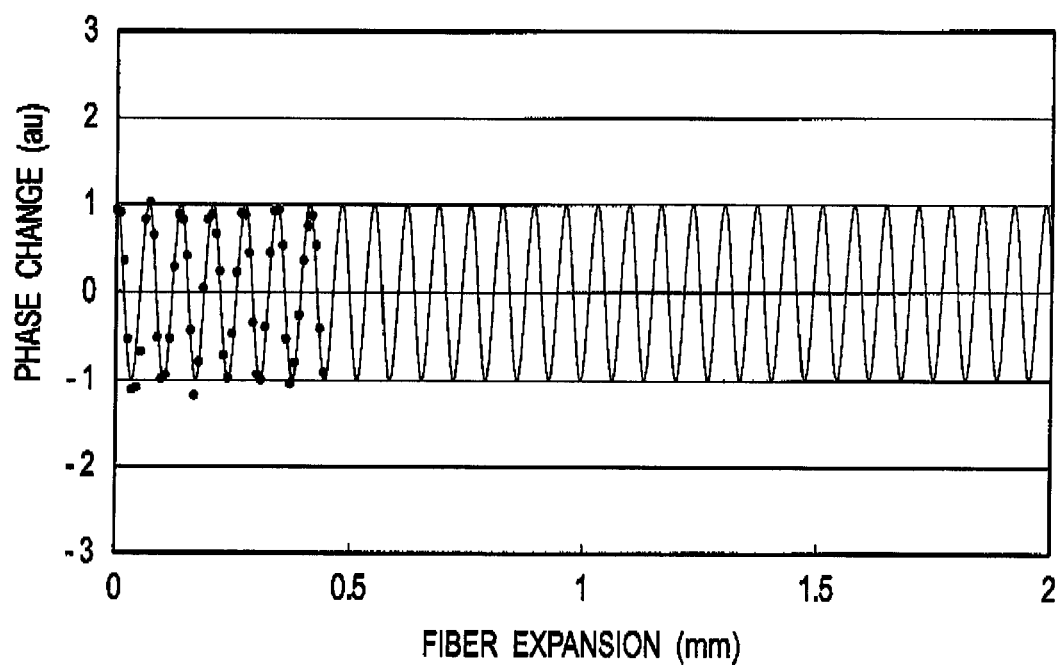
FIG. 9 is a graph illustrating a relationship between expansion and phase change of a panda-type fiber (125 μm in clad diameter) of Sample 1.
Figure 10:
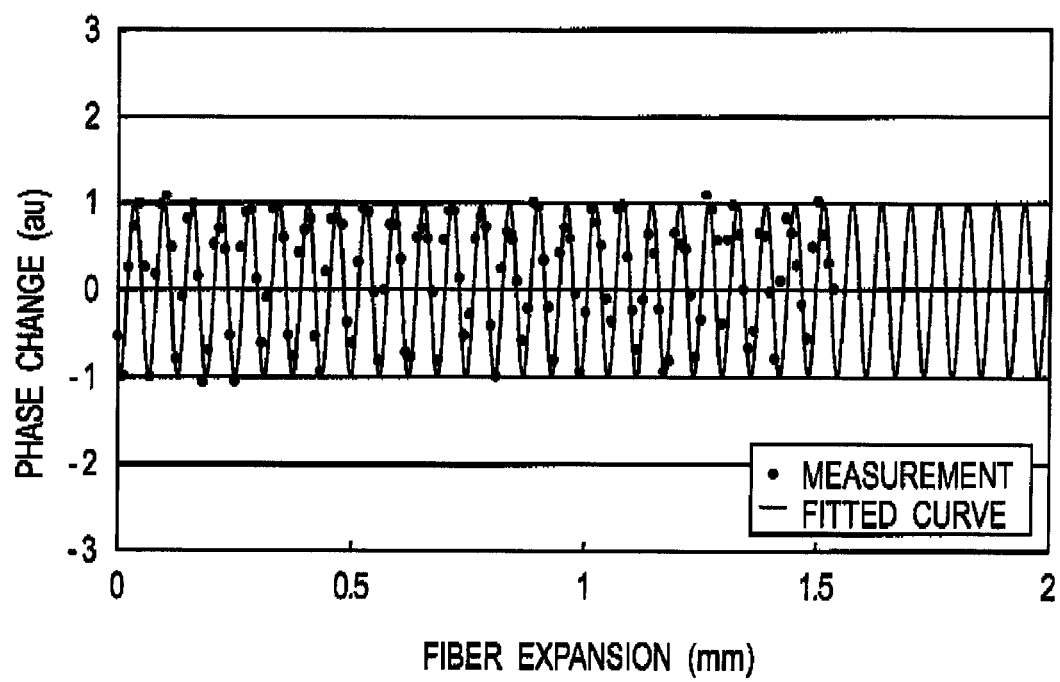
FIG. 10 is a graph illustrating a relationship between expansion and phase change of a panda-type fiber (125 μm in clad diameter) of Sample 2.
Figure 11:
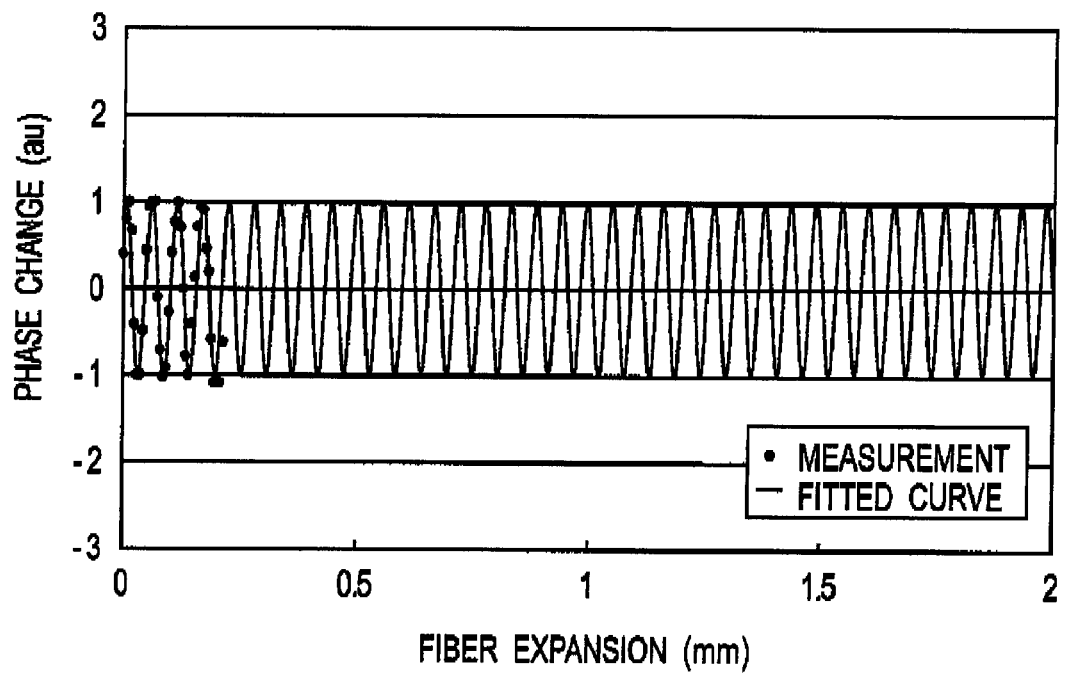
FIG. 11 is a graph illustrating a relationship between expansion and phase change of a panda-type fiber (80 μm in clad diameter) of Sample 3.
Figure 12:
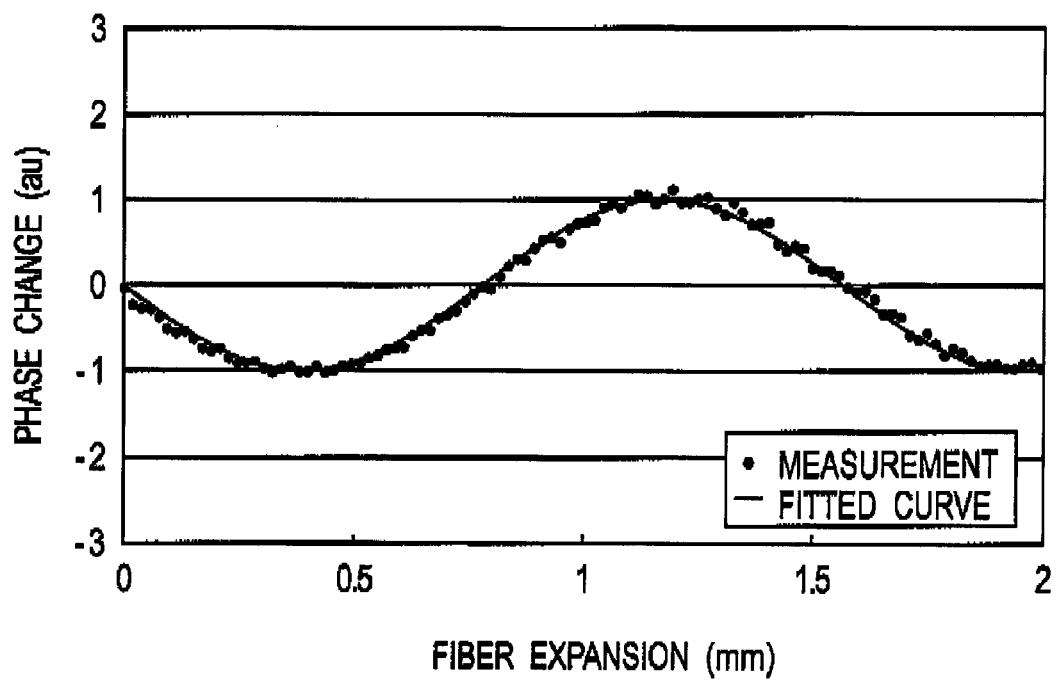
FIG. 12 is a graph illustrating a relationship between expansion and phase change of a bow-tie-type fiber (125 μm in clad diameter) of Sample 4.
Figure 13:
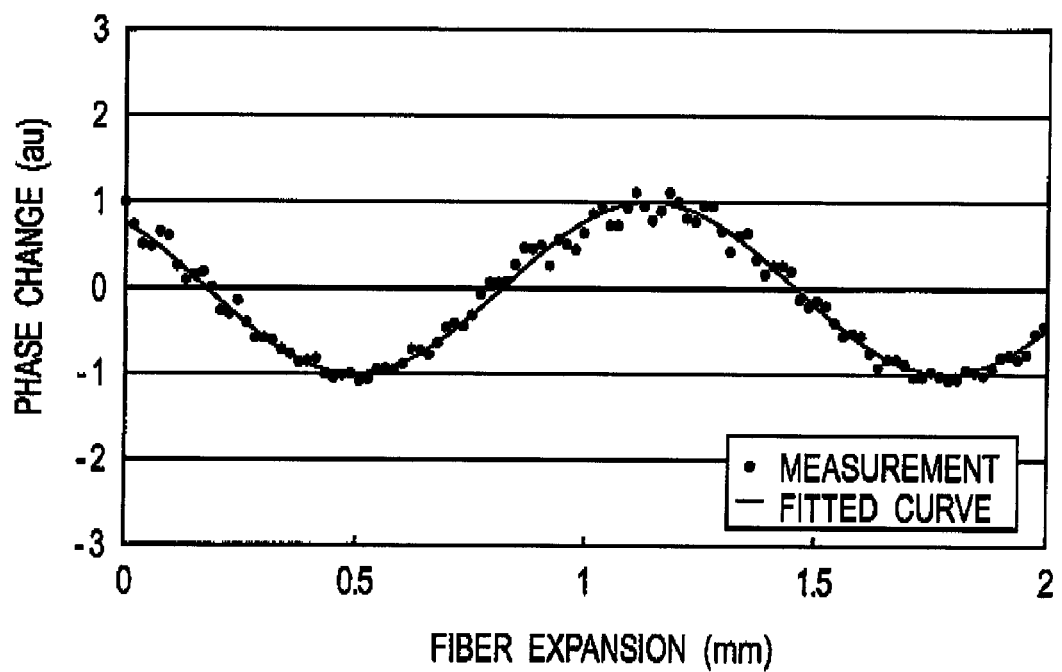
FIG. 13 is a graph illustrating a relationship between expansion and phase change of a bow-tie-type fiber (80 μm in clad diameter) of Sample 5.

Accordingly, linearly polarized light made incident at an incident angle of 45 degrees with respect to a light propagation axis of the polarization preserving fiber 102 beats its polarization state in a period of $\delta\beta \cdot z = 2n\pi$, as illustrated in FIG. 8. As a result, a beat length Lb is defined as follows:

$$L_b \equiv z = \frac{2\pi}{\delta\beta} \quad \text{[Mathematical 26]}$$

When longitudinal load is applied to the polarization preserving fiber, the refractive index of the fiber changes to change the propagation constant of each optical axis.

This is expressed as follows:

$$E_x = E_0 \exp i(\omega t - ((\beta_x + \Delta\beta_x) - (\beta_y + \Delta\beta_y)) \cdot z) \quad \text{[Mathematical 27]}$$

$$= E_0 \exp i(\omega t - \delta\beta \cdot z - (\Delta\beta_x - \Delta\beta_y) \cdot z)$$

$$E_y = E_0 \exp i\omega t$$

When longitudinal load is applied to the polarization preserving fiber, the phase of light propagated through the polarization preserving fiber changes. Accordingly, an expansion Δz and a phase change Δφ can be evaluated from a change in light quantity.

Figures 14, 15:
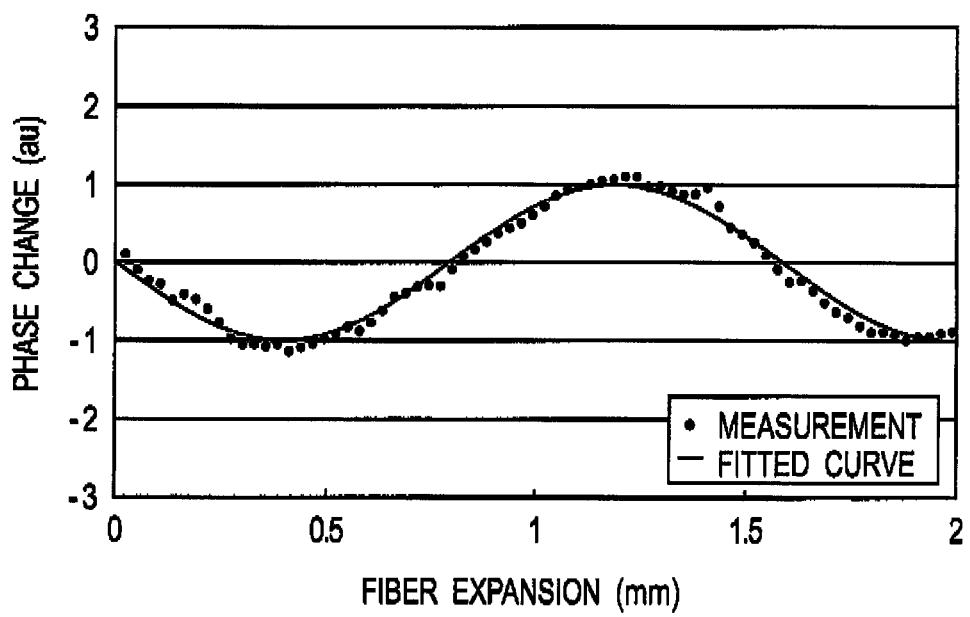
FIG. 14 is a graph illustrating a relationship between expansion and phase change of a elliptic core fiber (80 μm in clad diameter) of Sample 6.
FIG. 15 is Table 2.

Based on the above-mentioned theoretical consideration, longitudinal load is applied to the various kinds of polarization preserving fibers. FIGS. 9 to 14 illustrate phase changes with respect to fiber expansions caused by the longitudinal load and FIG. 15 is Table 2 listing the results.

It is understood from the results that the phase change of the panda-type fiber with respect to the longitudinal load is about 20 times larger than those of the bow-tie fiber and elliptic core fiber.

Based on the evaluations mentioned above, embodiments of the present invention will be explained in detail.

(First Embodiment)

A photosensor according to the first embodiment of the present invention will be explained with reference to FIG. 16. A phase modulator 10 illustrated in FIG. 16 has a cylindrical piezoelectric element (PZT) 11 and a polarization preserving fiber 12 that is wound around the piezoelectric element 11 in such a way that directions 12a and 12b of light propagation axes of the fiber 12 form about 45 degrees relative to directions 11a to 11d of mechanical stress of the cylindrical piezoelectric element 11. The photosensor employing the phase modulator 10 of such a configuration may be constituted like the related art illustrated in FIG. 1 of the Patent Document 1. Also, the phase modulator 10 may be adopted as the phase modulator 7 of the related art illustrated in FIG. 1 of the Patent Document 2. Further, the phase modulator 10 may be adopted as the optical fiber acoustic sensor 212 of the related art illustrated in FIG. 2 of the Patent Document 3. In addition, the photosensor employing the phase modulator according to this embodiment is adoptable for related arts of various configurations.

Operation of the phase modulator 10 according to the embodiment will be explained. Applying mechanical stress to the polarization preserving fiber 12 in the directions 11a to 11d that form about 45 degrees relative to the directions 12a and 12b of the light propagation axes results in substantially equalizing the mechanical stress applied to the two light propagation axes of the polarization preserving fiber 12. This prevents a light transmission loss of the polarization preserving fiber 12 due to the mechanical stress from being biased to one of the light propagation axes, thereby reducing light intensity modulation.

Applying a sinusoidal voltage signal to the phase modulator 10 to provide the polarization preserving fiber 12 with phase modulation will be considered. The sinusoidal voltage signal has a frequency (modulation frequency) of ωm. Then, intensities (Px, Py) of light propagated through the two light propagation axes (x-axis and y-axis) of the polarization preserving fiber are expressed in simplified forms as follows:

$$P_x = P_{x,t} + \Delta P_{x,l} \cdot \sin(\omega_m \cdot t)$$

$$P_y = P_{y,t} + \Delta P_{y,l} \cdot \sin(\omega_m \cdot t) \quad \text{[Mathematical 28]}$$

Here, Px,t and Py,t are light quantities propagated through the polarization preserving fiber 12 and ΔPx,l and ΔPy,l are light quantities lost by the mechanical stress applied to the polarization preserving fiber 12. If the mechanical stress is biased to one of the two light propagation axes of the polarization preserving fiber 12, for example, to the x-axis, the influence of the item "ΔPx,l·sin(ωm·t)" becomes larger so that the x-axis receives intensity modulation. An interference-type photosensor employing a phase modulator finds a measuring physical quantity according to an interfering light quantity. If there is intensity modulation, varying light signals caused by the intensity modulation deteriorate the accuracy of the measuring system. Using the phase modulator 10 of the configuration of FIG. 16 that hardly causes intensity modulation realizes a photosensor capable of conducting a highly accurate measurement. An effective light quantity is an interference component of the light propagated through the x-axis and the light propagated through the y-axis, and therefore, is determined by a lower one of the values Px and Py. If the mechanical stress is biased to one of the two light propagation axes of the polarization preserving fiber 12, for example, to the x-axis, the effective light quantity decreases in a time domain having a larger propagation loss, to reduce an effective signal component of the measuring system, thereby deteriorating the measuring accuracy of the photosensor. In connection with this, the phase modulator of the configuration of FIG. 16 can minimize a reduction in the effective light quantity, to realize a photosensor capable of conducting a highly accurate measurement.

Figure 16:
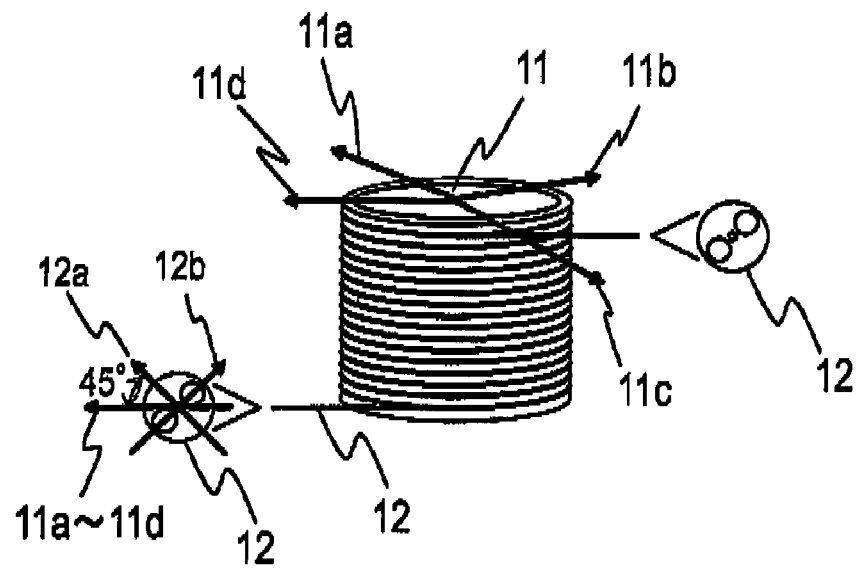
FIG. 16 is an explanatory view of a phase modulator according to a first embodiment of the present invention.

The phase modulator 10 according to the first embodiment illustrated in FIG. 16 uses the piezoelectric element (PZT) 11. In place of this, an actuator (to induce mechanical vibration on ceramics with light) employing a ceramic element such as a PLZT ceramic element (a lead titanate zirconate lanthanum ceramic element made of a solid solution of lead titanate and lead zirconate added with lanthanum oxide) may be used to form a phase modulator that is capable of easily applying mechanical vibration to the polarization preserving fiber 12 and applying a phase change of optional waveform to the polarization preserving fiber 12. A photosensor with such a phase modulator provides signal processing (detection such as serrodyne detection and heterodyne detection) with a wider tolerance, thereby improving the measuring accuracy of the photosensor.

(Second Embodiment)

Figure 17:
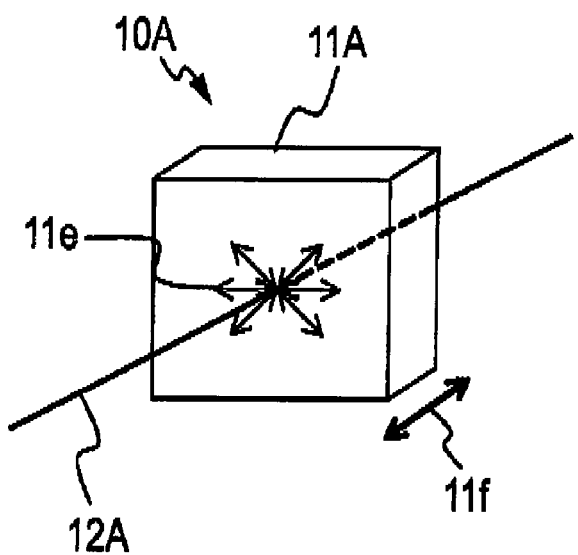
FIG. 17 is an explanatory view of a phase modulator according to a second embodiment of the present invention.

A phase modulator 10A according to the second embodiment of the present invention will be explained with reference to FIG. 17. The phase modulator 10A according to this embodiment has a rectangular parallelepiped piezoelectric element 11A having a hole and a polarization preserving fiber 12A inserted into the hole and fixed to the piezoelectric element 11A with, for example, an adhesive.

Around the hole formed through the piezoelectric element 11A of the phase modulator 10A, a side face of the polarization preserving fiber 12A isotropically receives mechanical stress 11e. Also in a light propagation direction 11f of the polarization preserving fiber 12A, the rectangular parallelepiped piezoelectric element 11A produces mechanical stress to apply tensile stress to the polarization preserving fiber 12A, thereby applying effective phase modulation to light propagated through the polarization preserving fiber 12A.

Like the first embodiment, the phase modulator 10A of the second embodiment may form a photosensor of optional configuration similar to those of the above-mentioned related arts.

The phase modulator 10A according to the embodiment substantially isotropically applies the mechanical stress 11e to two light propagation axes of the polarization preserving fiber 12A, so that a light transmission loss of the polarization preserving fiber 12A caused by the mechanical stress 11e may not be biased to one light propagation axis. This results in reducing light intensity modulation. Since a transmission loss difference between the light propagation axes of the polarization preserving fiber 12A caused by the mechanical stress 11e is suppressed, an effective optical signal light quantity component increases to realize a photosensor capable of conducting a highly accurate measurement.

(Third Embodiment)

Figure 18:
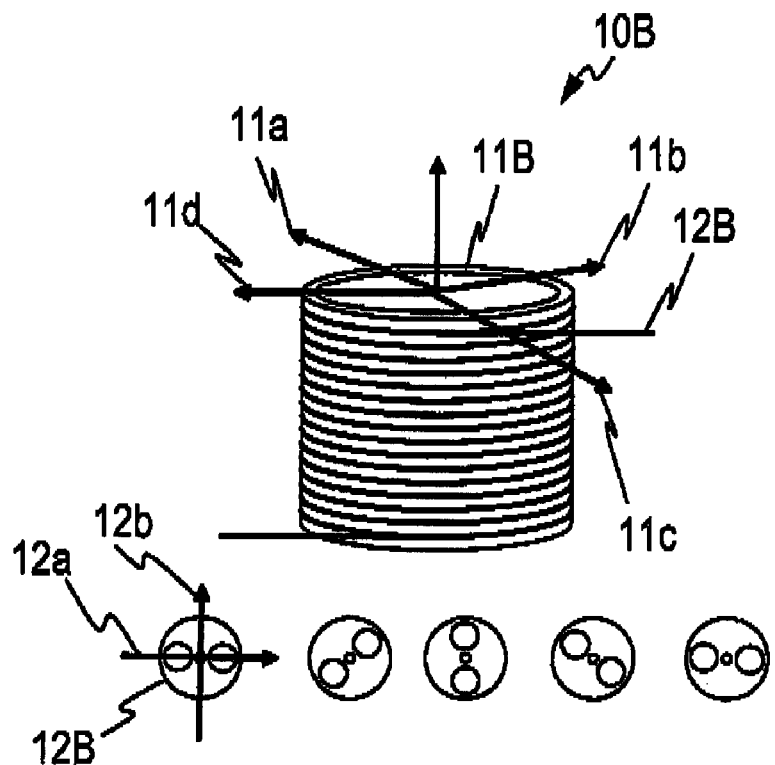
FIG. 18 is an explanatory view of a phase modulator according to a third embodiment of the present invention.

A phase modulator according to the third embodiment of the present invention will be explained with reference to FIG. 18. The phase modulator 103 according to this embodiment winds, like the first embodiment, a polarization preserving fiber 123 around a cylindrical piezoelectric element 118.

The embodiment is characterized in that the polarization preserving fiber 128 is wound around the piezoelectric element 11B at a predetermined twist rate. For example, the polarization preserving fiber 12B is twisted once when wound around the piezoelectric element 11B by one turn. This equalizes mechanical stress applied to two light propagation axes of the polarization preserving fiber 12B turn by turn. The phase modulator 10B of the embodiment may form a photosensor of optional configuration similar to those of the above-mentioned related arts.

The phase modulator 10B according to the embodiment winds the polarization preserving fiber 12B around the cylindrical piezoelectric element 11B at a predetermined twist rate, to equalize mechanical stress 11a to 11d applied to the two light propagation axes 12a and 12b of the polarization preserving fiber 12B and reduce a light transmission loss difference between the two light propagation axes 12a and 12b caused by bending stress. This results in increasing an effective optical signal light quantity component and realizing a photosensor capable of conducting a highly accurate measurement. In addition, the mechanical stress 11a to 11d applied from the piezoelectric element 11B is substantially equalized with respect to the two light propagation axes 12a and 12b of the polarization preserving fiber 12B. Namely, a light transmission loss of the polarization preserving fiber 12B due to the mechanical stress 11a to 11d is not biased to one light propagation axis, and therefore, light intensity modulation is minimized. A transmission loss difference between the light propagation axes 12a and 12b of the polarization preserving fiber 12B caused by the mechanical stress 11a to 11d of the piezoelectric element 118 is reduced to increase an effective optical signal light quantity component and realize a photosensor capable of conducting a highly accurate measurement. Compared with the phase modulator of the related art that randomly winds a polarization preserving fiber around a cylindrical or columnar piezoelectric element, the embodiment stabilizes a modulation characteristic and improves the productivity of phase modulators.

Although the first and third embodiments employ the cylindrical piezoelectric elements 11 and 11B, it is possible to employ columnar piezoelectric elements to form phase modulators having similar effects.

The first and third embodiments may employ panda-type optical fibers as the polarization preserving fibers 12 and 12B, to induce phase modulation that is about 20 times larger than that induced by a bow-tie fiber or an elliptic core fiber. In this case, the phase modulators 10 and 10B can efficiently apply phase modulation, to realize a photosensor capable of conducting a highly accurate measurement.

Generally, mass-produced polarization preserving fibers are classified into those having a clad diameter of about 125 μm and those having a clad diameter of about 80 μm. As the clad diameter of an optical fiber decreases, mechanical stress in a lateral pressure direction caused by a bend applied to the optical fiber becomes smaller. Accordingly, using a panda-type fiber of 80 μm in clad diameter as the polarization preserving fibers 12 and 12B results in reducing mechanical stress applied to the two light propagation axes 12a and 12b of the panda-type fiber in the side pressure direction and minimizing a light transmission loss difference between the two light propagation axes 12a and 12b due to bending stress. This results in increasing an effective optical signal light quantity component and realizing a photosensor capable of conducting a highly accurate measurement. The panda-type fiber of about 80 μm in clad diameter causes a large change in a propagation constant difference between the two light propagation axes 12a and 12b with respect to mechanical tensile force, and therefore, the panda-type fiber of about 80 μm in clad diameter can form a phase modulator capable of efficiently applying phase modulation and a photosensor capable of conducting a highly accurate measurement.

As evaluated in "(3) Evaluation of phase change caused by load applied to optical fiber" mentioned above, a side pressure (lateral load) on an optical fiber induces a smaller phase to light propagated through the optical fiber than that induced by longitudinal load (tensile stress). It, however, causes a phase change on the light. A cladding that is hard in a side pressure direction may be used to cover the polarization preserving fiber, so that mechanical stress in the side pressure direction may not directly be applied to the optical fiber. This may reduce a light transmission loss difference between the two light propagation axes of the polarization preserving fiber caused by mechanical stress in the side pressure direction, increase an effective optical signal light quantity component, and realize a photosensor capable of conducting a highly accurate measurement. The polarization preserving fiber may be covered with ultraviolet (UV) curing resin or a metal coated film, to easily provide the same effect.

(Fourth Embodiment)

A photosensor according to the fourth embodiment of the present invention will be explained with reference to FIG. 19. The photosensor of this embodiment uses the phase modulation technique for optical detection. A photo-sensing unit 21 measures a measuring physical quantity and provides an optical signal. From the optical signal, a signal processing unit 22 calculates a specified physical quantity. The photo-sensing unit 21 and signal processing unit 22 are optically connected to each other through a polarization preserving fiber 23. The embodiment is characterized in that the polarization preserving fiber 23 is a bow-tie fiber. The photosensor using the phase modulation technique for optical detection may employ the configuration of an optional prior art.

The photosensor according to the embodiment employs a bow-tie fiber as the polarization preserving fiber 23 to optically connect the signal processing unit 22 and photo sensing unit 21 to each other. Effect and operation of this configuration will be explained. The bow-tie fiber is a polarization preserving fiber that demonstrates a small change in a propagation constant difference between the two light propagation axes of the fiber with respect to tensile strength. Even if mechanical stress due to vibration, thermal shook, sound, and the like is applied to the polarization preserving fiber 23, an error phase difference occurring in the bow-tie fiber due to the mechanical stress is small. Accordingly, the bow-tie fiber allows the photosensor to conduct a highly accurate measurement.

As explained in connection with the related arts, there is a photosensor employing a phase modulator and including a photo-sensing unit, a signal processing unit to calculate a measuring physical quantity, and an optical fiber to connect the photo-sensing unit and signal processing unit to each other. If the light-transmitting polarization preserving fiber to transmit an optical signal receives an external resonant phenomenon due to vibration, thermal shock, sound, and the like, the light propagated through the polarization preserving fiber will contain an error phase difference to deteriorate the characteristics and measuring accuracy of the photosensor. To cope with this problem, the photosensor according to the embodiment employs the polarization preserving fiber 23 that demonstrates a small change in a propagation constant difference between the two light propagation axes of the fiber with respect to tensile stress, thereby minimizing the above-mentioned error phase difference.

As mentioned in "(3) Evaluation of phase change caused by load applied to optical fiber", the bow-tie fiber or the elliptic core fiber demonstrates about 20 times as small phase change as the panda-type fiber with respect to tensile stress. Using the bow-tie fiber or the elliptic core fiber as the light-transmitting polarization preserving fiber reduces an error phase difference occurring in the polarization preserving fiber even if mechanical stress due to vibration, thermal shock, sound, and the like is applied to the polarization preserving fiber. Consequently realized is a photosensor capable of conducting a highly accurate measurement.

Generally, mass-produced bow-tie fibers and elliptic core fibers are classified into those having a clad diameter of about 125 μm and those having a clad diameter of about 80 μm. As the clad diameter of an optical fiber decreases, mechanical stress in a lateral pressure direction caused by a bend applied to the optical fiber becomes smaller. Accordingly, using an optical fiber of 80 μm in clad diameter for the polarization preserving fiber results in reducing mechanical stress applied to the two light propagation axes of the polarization preserving fiber in the side pressure direction and minimizing a light transmission loss difference between the two light propagation axes due to bending stress. In addition, the fiber can reduce an error phase difference occurring in the fiber due to the mechanical stress, thereby realizing a photosensor capable of conducting a highly accurate measurement. The bending stress includes that caused by a local bend of the polarization preserving fiber that is caused by vibration, thermal shock, sound, and the like. Compared with the panda-type fiber, the bow-tie fiber and elliptic core fiber of about 80 μm in clad diameter demonstrate a smaller change in a propagation constant difference between the two light propagation axes of the fiber with respect to tensile stress. Accordingly, even if mechanical stress due to vibration, thermal shock, sound, and the like is applied to the bow-tie fiber and elliptic core fiber of about 80 μm in clad diameter, an error phase difference occurring in the bow-tie fiber and elliptic core fiber of about 80 μm in clad diameter is small. This result in realizing a photosensor capable of conducting a highly accurate measurement.

(Fifth Embodiment)

Figure 20:
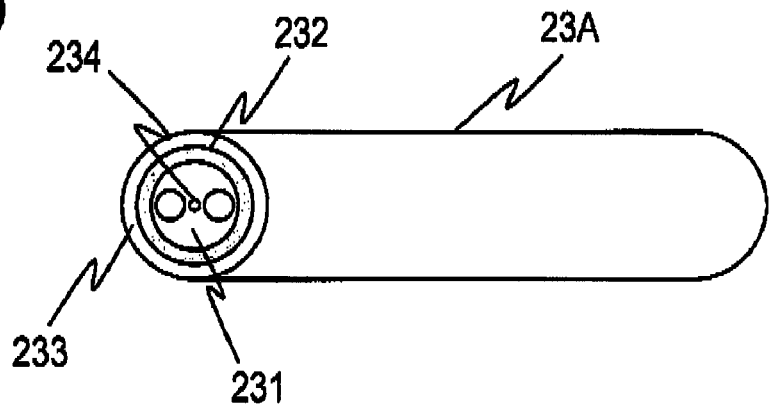
FIG. 20 is an explanatory view of a polarization preserving fiber used with a photosensor according to a fifth embodiment of the present invention.

A photosensor according to the fifth embodiment of the present invention will be explained with reference to FIG. 20.

Figure 19:
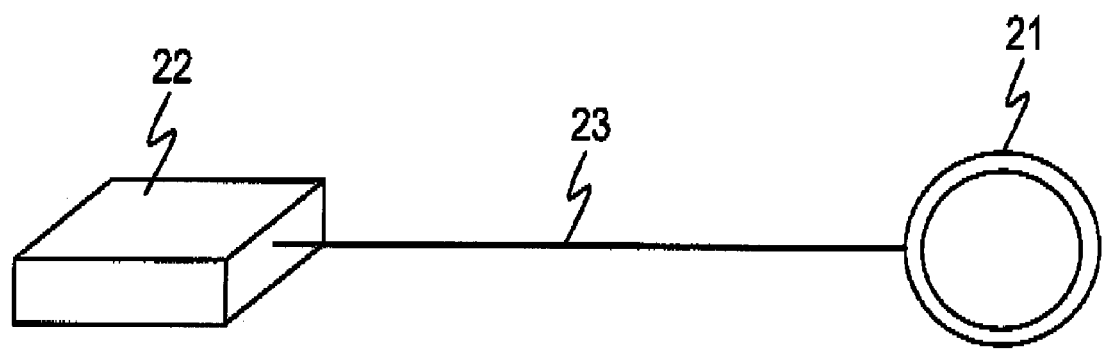
FIG. 19 is an explanatory view of a photosensor according to a fourth embodiment of the present invention.

The photosensor according to this embodiment employs the same configuration as that of the fourth embodiment illustrated in FIG. 19 and includes a photo-sensing unit 21, a signal processing unit 22, and a polarization preserving fiber 23A to optically connect them to each other. This embodiment is characterized in that the polarization preserving fiber 23A employs a configuration illustrated in FIG. 20. The polarization preserving fiber 23A is a panda-type fiber that includes a clad 231, a resilient material 232 surrounding the clad 231, and an outer resin coat 233 surrounding the resilient material 232. The resilient material 232 may be made of silicon rubber.

The polarization preserving fiber 23A of such a structure prevents a fiber core 234 from directly receiving mechanical stress caused by vibration, thermal shock, sound, and the like and reduces an error phase difference to be caused in the fiber core 234 due to the mechanical stress, thereby allowing the photosensor to conduct a highly accurate measurement.

As mentioned in "(3) Evaluation of phase change caused by load applied to optical fiber", longitudinal load (tensile stress) applied to an optical fiber causes a phase difference on light propagated through the optical fiber. Even if the outer coat of the light-transmitting polarization preserving fiber 23A is stretched, no tensile stress is directly applied to the internal fiber clad 231 and fiber core 234. This structure minimizes an error phase difference occurring in the polarization preserving fiber due to the tensile stress, thereby allowing the photosensor to conduct a highly accurate measurement.

(Sixth Embodiment)

Figure 21A:
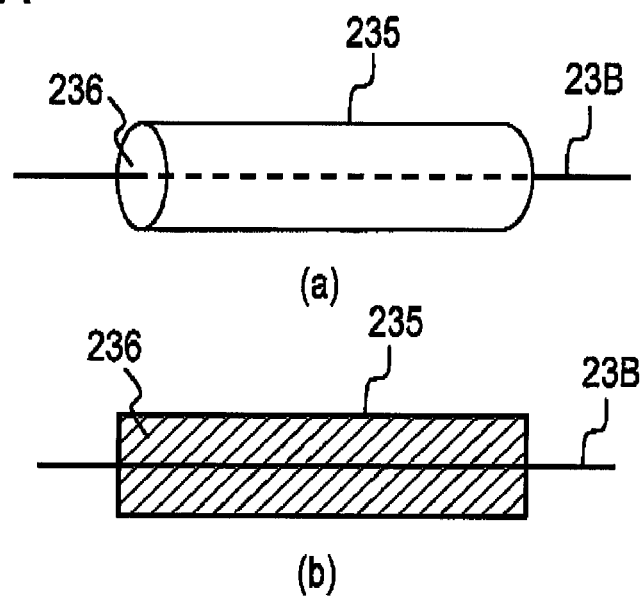
FIG. 21A is a perspective view and sectional view of a polarization preserving fiber used with a photosensor according to a sixth embodiment of the present invention.
Figure 21B:
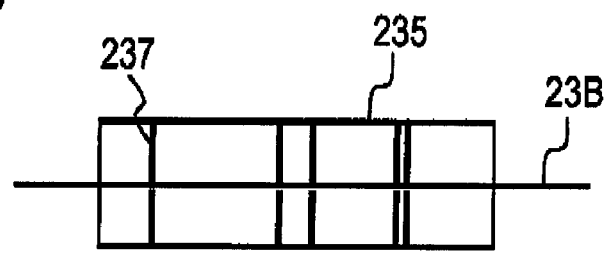
FIG. 21B is a sectional view of another polarization preserving fiber used with the photosensor according to the sixth embodiment of the present invention.

A photosensor according to the sixth embodiment of the present invention will be explained with reference to FIGS. 21A and 21B. The photosensor of this embodiment employs the same configuration as that of the fourth embodiment illustrated in FIG. 19 and includes a photo-sensing unit 21, a signal processing unit 22, and a polarization preserving fiber 23B to optically connect them to each other. This embodiment is characterized in that, as illustrated in FIG. 21A, the polarization preserving fiber 23B is covered with a protective tube 235, and between the protective tube 235 and the polarization preserving fiber 23B inserted in the same, a sound/vibration-proof material 236 made of a resilient material such as a cushion is packed. Instead of the sound/vibration-proof material 236, soundproof walls 237 made of resilient material may discontinuously be arranged inside the protective tube 235 as illustrated in FIG. 21B.

In the photosensor according to the embodiment, the photo-sensing unit 21 and signal processing unit 22 are optically connected to each other with the polarization preserving fiber 23B that is covered with the protective tube 235 so that external tensile stress may not be applied to the fiber. Inside the protective tube 235, the sound/vibration-proof material 236 is packed or the soundproof walls 237 are arranged to prevent a resonance from being caused by vibration, sound, and the like. As a result, mechanical stress caused by a resonance due to vibration, sound, and the like is not directly applied to the polarization preserving fiber 238, This results in minimizing an error phase difference in the polarization preserving fiber 23B due to the mechanical stress, thereby allowing the photosensor to conduct a highly accurate measurement.

(Seventh Embodiment)

Figure 22A:
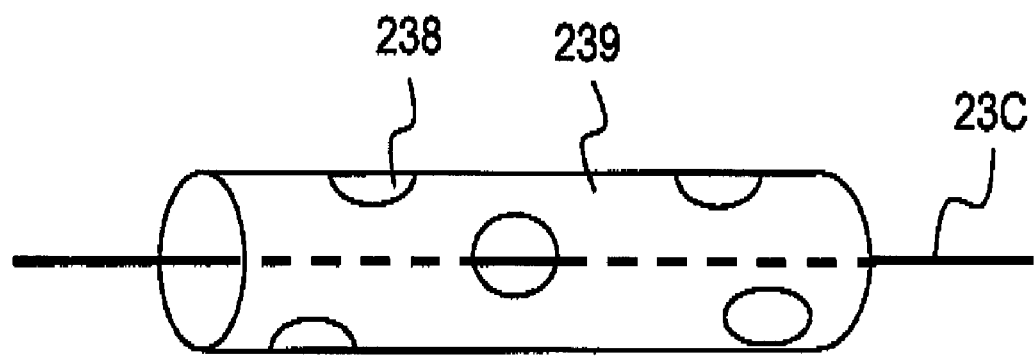
FIG. 22A is a perspective view of a polarization preserving fiber used with a photosensor according to a seventh embodiment of the present invention.
Figure 22B:
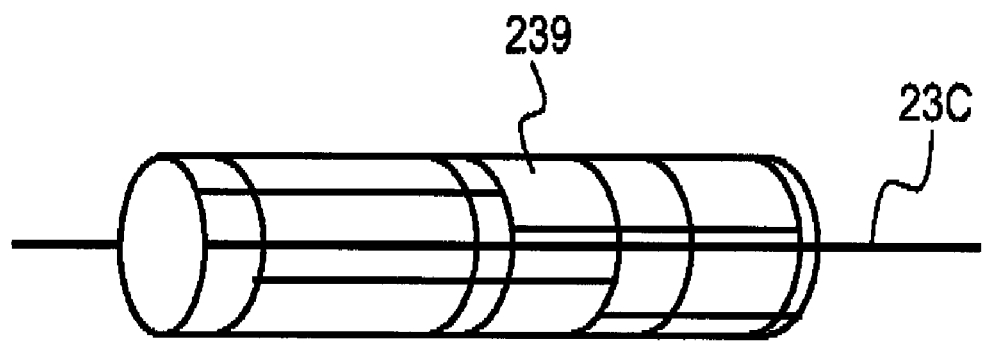
FIG. 22B is a sectional view of another polarization preserving fiber used with the photosensor according to the seventh embodiment of the present invention.

A photosensor according to the seventh embodiment of the present invention will be explained with reference to FIGS. 22A and 223. The photosensor according to this embodiment employs the same configuration as that of the fourth embodiment illustrated in FIG. 19 and includes a photo-sensing unit 21, a signal processing unit 22, and a polarization preserving fiber 23C to optically connect them to each other. This embodiment is characterized in that, as illustrated in FIG. 22A, the polarization preserving fiber 23C is covered with a perforated protective tube 239 having a plurality of discontinuous holes 238. Instead of the perforated protective tube 239, a protective tube 239 having a discontinuous network structure illustrated in FIG. 228 is usable.

In the photosensor according to the embodiment, the perforated protective tube 238 or the network structure protective tube 239 covers the polarization preserving fiber 23C so that no standing wave due to sound or vibration is present inside the protective tube 238 (239). This suppresses a resonant phenomenon due to sound or vibration inside the protective tube 238 (239), minimizes mechanical stress due to the resonant phenomenon applied to the optical fiber, and reduces an error phase difference to be caused in the polarization preserving fiber 23C by the mechanical stress, thereby allowing the photosensor to conduct a highly accurate measurement.

(Eighth Embodiment)

Figure 23:
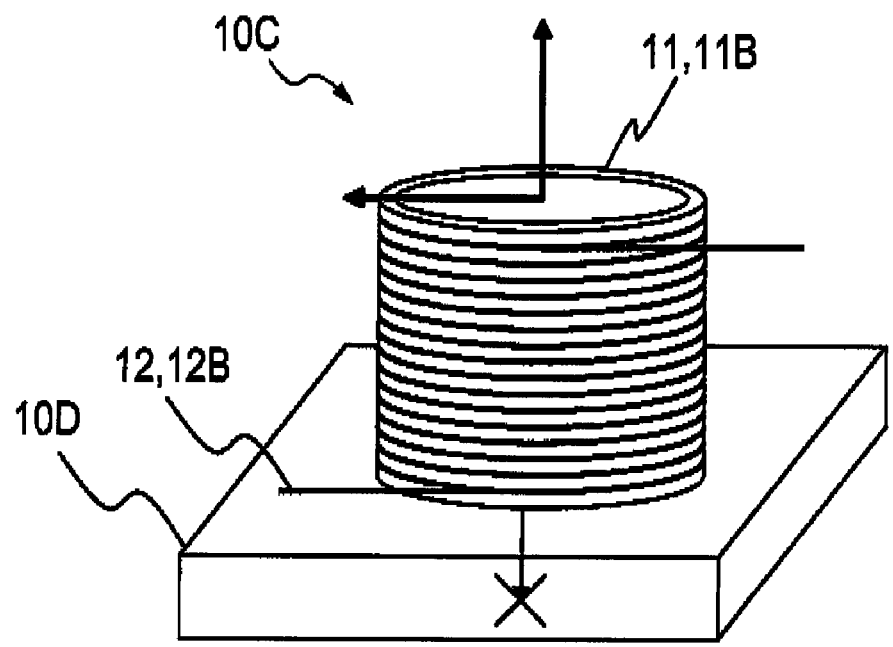
FIG. 23 is a perspective view of a phase modulator assembly according to an eighth embodiment of the present invention.

A phase modulator assembly according to the eighth embodiment of the present invention will be explained with reference to FIG. 23. The phase modulator assembly according to the embodiment includes a phase modulator 10C having the same configuration as the phase modulator 10 of the first embodiment illustrated in FIG. 16 or the phase modulator 10B of the third embodiment illustrated in FIG. 18 and a vibration absorbing material 10D made of gel to form a vibration-proof structure. A photosensor employing the phase modulator assembly 10 may have any configuration of the related arts mentioned above.

In the phase modulator assembly according to the embodiment, the vibration-proof structure prevents mechanical vibration from being transferred to a polarization preserving fiber 12 (128) of the phase modulator 10C, thereby reducing mechanical stress on the polarization preserving fiber 12 (12B), minimizing an error phase difference to be caused in the fiber due to the mechanical stress, and realizing a photosensor capable of conducting a highly accurate measurement. In addition, the influence of sound may be reduced by entirely covering the phase modulator 10C with a resilient material such as a cushion material.

(Ninth Embodiment)

Figure 24:
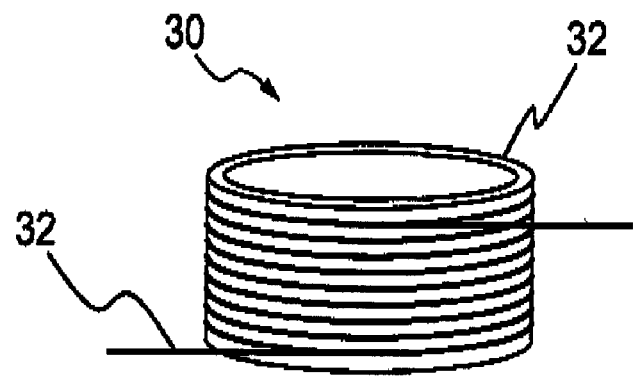
FIG. 24 is a perspective view of an optical element according to a ninth embodiment of the present invention.

An optical element according to the ninth embodiment of the present invention will be explained with reference to FIG. 24. The optical element according to this embodiment has no piezoelectric element serving as a phase modulator and is characterized in that it is constituted by winding a winding frame 31 with a coil-like polarization preserving fiber 32. The polarization preserving fiber 32 is a bow-tie fiber that demonstrates a small change in propagation constant difference between two light propagation axes with respect to tensile stress. Instead of the bow-tie fiber, an elliptic core fiber may be employable.

The optical element 30 according to the embodiment employs, as the polarization preserving fiber 32, a bow-tie fiber or an elliptic core fiber that demonstrates a small change in a propagation constant difference between the two light propagation axes of the fiber with respect to tensile stress. Even if mechanical stress caused by vibration, thermal shock, sound, and the like is applied to the polarization preserving fiber 32, an error phase difference occurring in the polarization preserving fiber 32 due to the mechanical stress is small, to realize a photosensor capable of conducting a highly accurate measurement. Namely, as mentioned in "(3) Evaluation of phase change caused by load applied to optical fiber", the bow-tie fiber or the elliptic core fiber demonstrates 20 times as small phase change as the panda-type fiber with respect to tensile stress. By employing the bow-tie fiber or the elliptic core fiber as the coil-like polarization preserving fiber 32, the optical element 30 causes a small error phase difference in the polarization preserving fiber 32 with respect to mechanical stress induced by vibration, thermal shock, sound, and the like, thereby realizing a photosensor capable of conducting a highly accurate measurement.

As explained with reference to the related arts, a photosensor includes many parts that are formed by winding polarization preserving fibers into coils. An example thereof is an optical fiber polarizer of the related art illustrated in FIG. 6 of the Patent Document 7. Other examples are a delay fiber coil in the reflection optical fiber current sensor illustrated in FIG. 1 of the Patent Document 4, a vibration sensor coil in the optical fiber vibration sensor illustrated in FIG. 1 of the Patent Document 1, and a sensing loop 6 in the phase modulator 7 and optical rotation detection apparatus illustrated in FIG. 1 of the Patent Document 2. Receiving external vibration or thermal shock, the polarization preserving fiber coil causes resonant vibration and resonant contraction depending on the shape of the coil and the shape of a winding frame. A vibration source will be created if the above-mentioned expansion/contraction vibration of the phase modulator is propagated to a part that is not originally intended. If the resonant vibration or the resonant contraction occurs, the polarization preserving fiber will expand and contract to create a phase difference in the polarization preserving fiber due to the same principle as that of the phase modulator mentioned above. This is an error phase difference that is different from an originally intended controlled phase difference, and therefore, deteriorates the characteristics and measuring accuracy of the photosensor. To cope with this, the optical element according to the embodiment employs the polarization preserving fiber that demonstrates a small change in a propagation constant difference between the two light propagation axes of the fiber with respect to tensile stress. Even if a resonant phenomenon expands and contracts the polarization preserving fiber 12D, an error phase difference occurring in the polarization preserving fiber 12D is small, thereby realizing a photosensor capable of conducting a highly accurate measurement.

The invention claimed is:

1. A phase modulator comprising a cylindrical or columnar actuator whose body has a characteristic of inducing mechanical vibration and a polarization preserving fiber having two light propagation axes that are orthogonal to each other, the fiber being wound around the actuator in such a manner to receive mechanical stress caused by the mechanical vibration in directions each of about 45 degrees with respect to the two light propagation axes.

2. The phase modulator as set forth in claim 1, wherein:
the actuator is a piezoelectric element; and
the polarization preserving fiber is wound around the piezoelectric element in such a manner that the light propagation axes of the polarization preserving fiber each form an angle of about 45 degrees with respect to a diametrical direction of the piezoelectric element.

3. A phase modulator assembly comprising the phase modulator of claim 1 and a vibration-proof material.

4. A phase modulator comprising a cylindrical or columnar actuator whose body has a characteristic of inducing mechanical vibration and a polarization preserving fiber having two light propagation axes that are orthogonal to each other, the fiber being wound around the actuator in such a manner to receive mechanical stress isotropically with respect to the two light propagation axes.

5. A phase modulator comprising a cylindrical or columnar actuator whose body has a characteristic of inducing mechanical vibration and a polarization preserving fiber having two light propagation axes that are orthogonal to each other, the fiber being wound around the actuator at a predetermined twist rate.

6. The phase modulator as set forth in any one of claims 1 to 5, wherein the polarization preserving fiber is a panda-type fiber.

7. The phase modulator as set forth in claim 6, wherein the polarization preserving fiber is a panda-type fiber of about 80 μm in clad diameter.

8. The phase modulator as set forth in any one of claims 1 to 5, wherein the polarization preserving fiber is covered with a clad material that is hard in a side pressure direction.

9. The phase modulator as set forth in claim 8, wherein the clad material of the polarization preserving fiber is ultraviolet curing resin.

10. The phase modulator as set forth in claim 8, wherein the clad material of the polarization preserving fiber is a metal film.

11. The phase modulator as set forth in claim 1 or 4, wherein the actuator is a ceramic element.

12. A photosensor comprising a photo-sensing unit to measure a measuring physical quantity, a signal processing unit to calculate a specified physical quantity according to a light signal from the photo-sensing unit, and an optical fiber to optically connect the photo-sensing unit and signal processing unit to each other, the optical fiber being a polarization preserving fiber having two light propagation axes each of which propagates light,
the polarization preserving fiber being one that demonstrates a small change in a propagation constant difference between the two light propagation axes with respect to tensile stress.

13. The photosensor as set forth in claim 12, wherein the polarization preserving fiber to optically connect the photo-sensing unit and signal processing unit to each other is a bow-tie fiber.

14. The photosensor as set forth in claim 13, wherein the polarization preserving fiber to optically connect the photo-sensing unit and signal processing unit to each other is a bow-tie fiber of about 80 μm in clad diameter.

15. The photosensor as set forth in claim 12, wherein the polarization preserving fiber to optically connect the photo-sensing unit and signal processing unit to each other is an elliptic core fiber.

16. The photosensor as set forth in claim 15, wherein the polarization preserving fiber to optically connect the photo-sensing unit and signal processing unit to each other is an elliptic core fiber of about 80 μm in clad diameter.

17. The photosensor as set forth in any one of claims 12 to 16, wherein the cladding of the polarization preserving fiber to optically connect the photo-sensing unit and signal processing unit to each other is surrounded with a resilient material.

18. The photosensor as set forth in claim 17, wherein the protective tube has a side face provided with holes at predetermined intervals.

19. The photosensor as set forth in any one of claims 12 to 16, wherein the polarization preserving fiber to optically connect the photo-sensing unit and signal processing unit to each other is inserted in a protective tube to prevent external tensile stress from being applied to the fiber, the inside of the protective tube being structured not to cause a resonance due to vibration or sound.

20. The photosensor as forth in claim 19, wherein a sound absorbing material is filled between the polarization preserving fiber and the protective tube.

21. The photosensor as set forth in claim 20, wherein the protective tube has a side face provided with holes at predetermined intervals.

22. A photosensor including a photo-sensing unit to measure a measuring physical quantity, a signal processing unit to calculate a specified physical quantity according to a light signal from the photo-sensing unit, and an optical fiber to optically connect the photo-sensing unit and signal processing unit to each other, the photosensor comprising:

other than a phase modulator, a coil-shaped optical element formed of a polarization preserving fiber that demonstrates a small change in a propagation constant difference between two light propagation axes of the fiber with respect to tensile stress.

23. The photosensor as set forth in claim 22, wherein the polarization preserving fiber is a bow-tie fiber.

24. The photosensor as set forth in claim 22, wherein the polarization preserving fiber is an elliptic core fiber.

* * * * *